H. F. McCLAIN.
AUTOMOBILE RADIATOR SHIELD.
APPLICATION FILED JULY 16, 1919.

1,358,224.

Patented Nov. 9, 1920.

H. F. McClain.
Inventor

Witness

By
Attorneys

UNITED STATES PATENT OFFICE.

HUGH F. McCLAIN, OF PROTECTION, KANSAS.

AUTOMOBILE-RADIATOR SHIELD.

1,358,224.   Specification of Letters Patent.   Patented Nov. 9, 1920.

Application filed July 16, 1919. Serial No. 311,329.

*To all whom it may concern:*

Be it known that I, HUGH F. McCLAIN, a citizen of the United States, residing at Protection, in the county of Comanche and State of Kansas, have invented a new and useful Automobile - Radiator Shield, of which the following is a specification.

The present invention relates to automobile radiator shields, the principal object being to provide a protective shield or cover for automobile radiators which will prevent the radiator from becoming frozen in cold weather.

A further object of the invention is to provide a protective cover for a radiator of an automobile which may be adjusted so that part of the entire surface of the radiator may be exposed to the atmosphere.

Still another object of the invention is to provide a protective shield for automobile radiators which includes a curtain so arranged as to be held firmly against the radiator together with a means for removing the dirt or mud from the curtain as the latter is drawn to the housing provided therefor.

Another object of this invention is to provide a weather shield for automobile radiators which may be operated from the chauffeur's seat.

Another object is to provide a device of this general character which is simple in construction consists of few parts and which may be manufactured and sold at a minimum cost.

With the above objects and other advantages in mind, the invention consists of the combinations of parts, constructions and arrangements, operations and general assemblage the detail of which will be hereinafter enlarged upon and recited in the subjoined claim.

Figure 1:
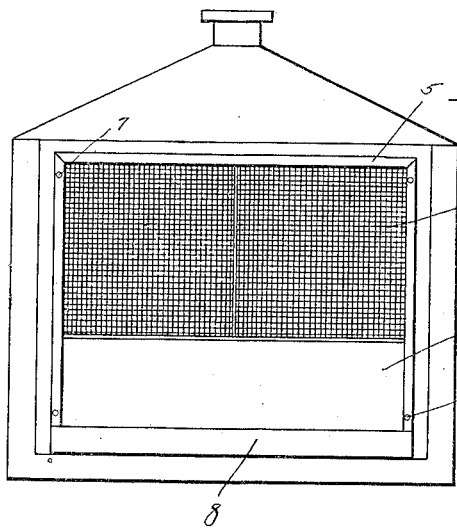
Figure 2:
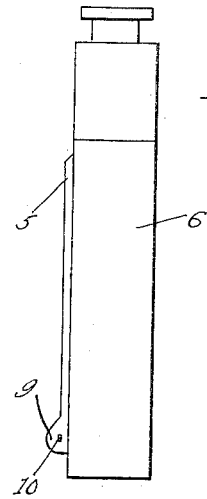
Figure 3:
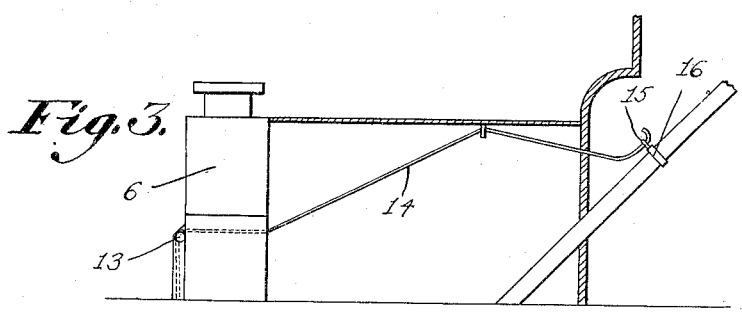
Figure 4:
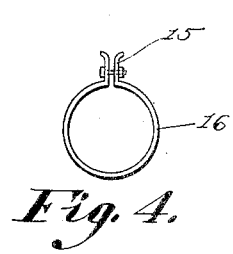
Figure 5:
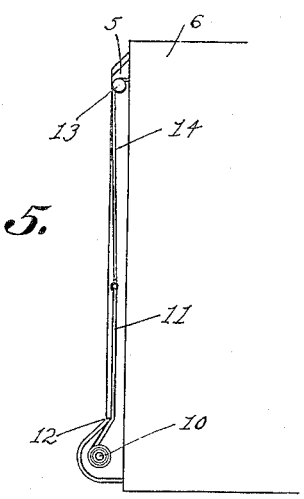
Figure 6:
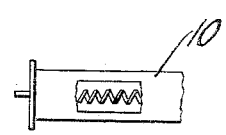

On the drawings:

Figure 1. is a front elevation of an auto radiator equipped with my improved shield;

Fig. 2. is an end elevation of the same;

Fig. 3. is a fragmentary view of an automobile partly in section and partly in elevation, part of the radiator shield appearing, and showing the operating mechanism;

Fig. 4. is a detail view of the flexible element holding clamp removed from the steering post;

Fig. 5. is an end elevation of the radiator shield parts being broken away;

Fig. 6. is a fragmentary detail view of the spring roller.

In carrying out this invention there is pivoted a substantially rectangular frame 5 mounted upon the outer face of the' automoble radiator designated at 6. The frame is secured to the radiator through the medium of fastenings 7.

A casing formed in the lower end of the frame 5 which consists of a front upwardly inclined resilient wall 8 and end wall 9 that constitutes bearings having a spring actuated roller 10 underlying the wall 8. Attached to the roller 10 is a curtain 11 adapted to overlie the front of the radiator to protect the same against weather, the upper longitudinal edge of the wall 8 terminates in a scraper 12 which lies against the curtain 11 and scrapes the mud therefrom that has splashed thereon from the roadway when the machine is in motion.

A roller 13 is mounted at the upper end of the frame centrally of the ends over which passes a flexible element 14 having one end attached to the curtain 11 and its opposite end extended through the hood to the steering point within reach of the operator and engaged with a resilient jaw 15 formed on a band 16 mounted upon the steering post.

From this disclosure it will be manifested that I have provided a simple protective shield which is easily reached and operated by the person driving the car.

The embodiment of the invention is illustrative only and it will be understood that the same may be modified and altered in many respects and that such limits of modifications are only governed by what is claimed.

What is claimed is:

In a shield for automobile radiators, a frame adapted to be mounted upon the radiator, a housing formed at the lower end of the frame, a curtain housed by said housing, said housing having an upwardly and inwardly extending wall forming a part thereof, said wall having a beveled edge to provide a scraper, said scraper adapted to contact with the curtain when the same is moved along the frame, and means for manipulating the curtain.

In testimony that I claim the foregoing as my own, I have hereto affixed my signature in the presence of two witnesses.

HUGH F. McCLAIN.

Witnesses:
F. B. FIELD,
CLAUDE ROWLAND.